United States Patent [19]

Katsutani et al.

[11] Patent Number: 4,968,899
[45] Date of Patent: Nov. 6, 1990

[54] CLOCK SIGNAL SWITCHING DEVICE OF AN IC CARD

[76] Inventors: Masafumi Katsutani, Akebonoryo, 2613-1 Ichinomoto-cho, Tenri-shi, Nara-ken; Kazuhiro Yaegawa, No. F1-203, Nishitomigaoka 2-chome, Nara-shi, Nara-ken, both of Japan

[21] Appl. No.: 334,566

[22] Filed: Apr. 7, 1989

[30] Foreign Application Priority Data

Apr. 9, 1988 [JP] Japan .................................. 63-87996

[51] Int. Cl.$^5$ .......................... H03K 5/13; H03K 3/01
[52] U.S. Cl. ..................................... 307/269; 307/64; 307/65; 307/296.6; 377/15; 377/19; 377/32
[58] Field of Search .................. 324/110, 111; 377/12, 377/15, 16, 19, 28, 30, 32, 50; 307/269, 219, 296.3, 296.4, 296.6, 64, 65

[56] References Cited

U.S. PATENT DOCUMENTS

| | | | |
|---|---|---|---|
| 4,612,657 | 9/1986 | Takahashi | 377/32 |
| 4,651,072 | 3/1987 | Takata | 307/64 |
| 4,675,539 | 6/1987 | Nichol | 307/65 |
| 4,850,000 | 7/1989 | Dias | 377/32 |

Primary Examiner—Andrew J. James
Assistant Examiner—Margaret Rose Wambach

[57] ABSTRACT

When an IC card is attached to a terminal unit, a counter counts pulses of an external clock signal and a switching circuit outputs the external clock signal to an internal circuit in place of an internal clock signal if a NAND gate determines that the count of pulses of the external clock signal by the counter is a predetermined value. When the IC card is ejected from the terminal unit, pulses of the internal clock signal are counted by a counter and when the count attains a predetermined value, the counter is cleared and the switching circuit outputs the internal clock signal to the internal circuit in place of the external clock signal in response to the output of the NAND gate. Thus, it can be correctly determined whether the IC card is operated in the form of a single body or in the form attached to any terminal unit.

4 Claims, 5 Drawing Sheets

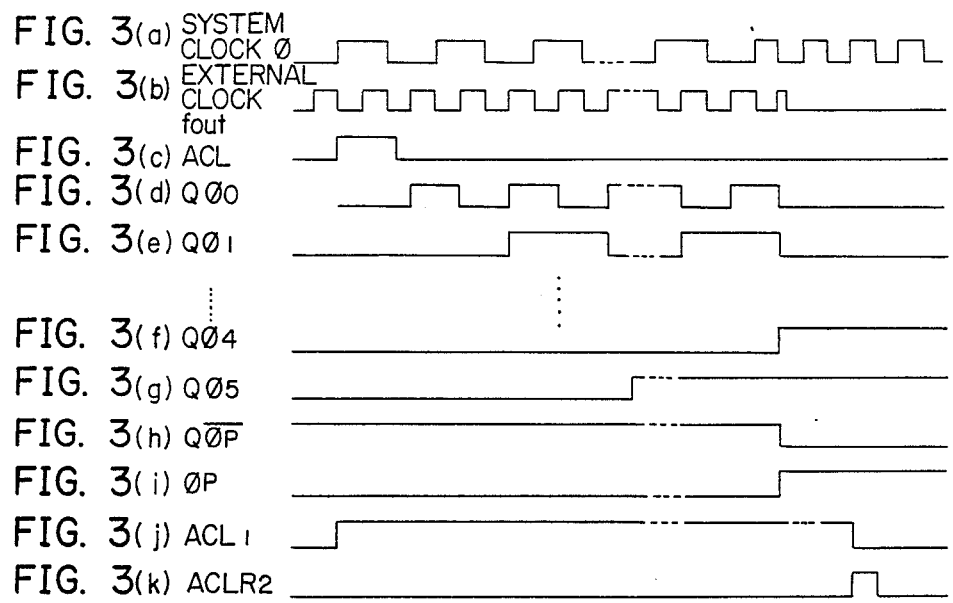
FIG. 3(a) SYSTEM CLOCK ø
FIG. 3(b) EXTERNAL CLOCK fout
FIG. 3(c) ACL
FIG. 3(d) Qø0
FIG. 3(e) Qø1
FIG. 3(f) Qø4
FIG. 3(g) Qø5
FIG. 3(h) QøP̄
FIG. 3(i) øP
FIG. 3(j) ACL1
FIG. 3(k) ACLR2
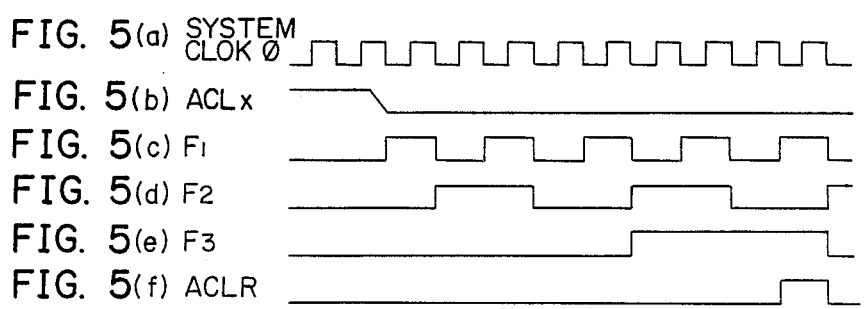
FIG. 5(a) SYSTEM CLOK ø
FIG. 5(b) ACLx
FIG. 5(c) F1
FIG. 5(d) F2
FIG. 5(e) F3
FIG. 5(f) ACLR

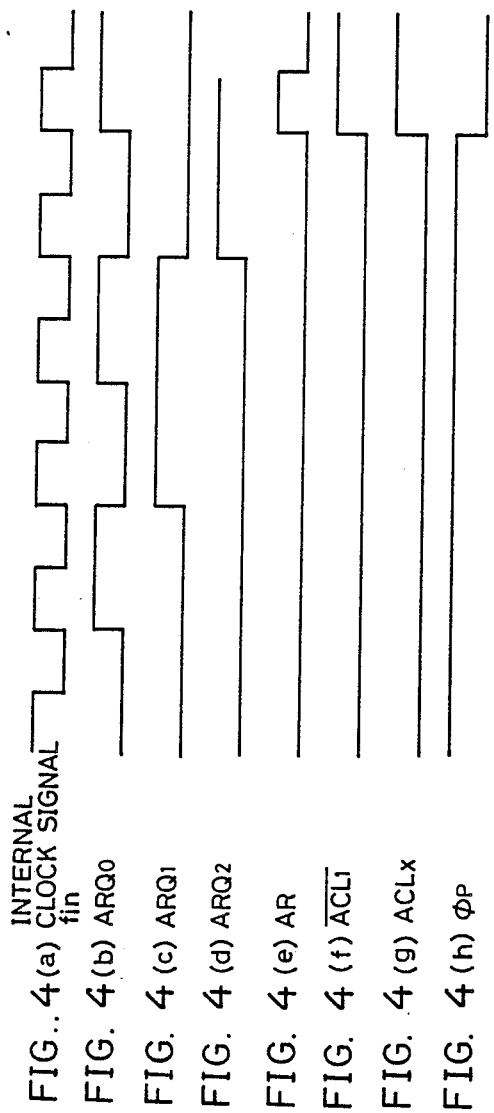

CLOCK SIGNAL SWITCHING DEVICE OF AN IC CARD

BACKGROUND OF THE INVENTION

1. Field of the Invention

The present invention relates to a clock signal switching device of an IC card. More particularly, the present invention relates to a clock signal switching device of an IC card for switching from an internal clock signal to an external clock signal supplied from a terminal unit. The IC card is operable in response to the internal clock signal and can be operated by the external clock signal in place of the internal clock signal when the IC card is attached to the terminal unit.

2. Description of the Background Art

IC cards provided with displays are utilized in various fields these days. Such an IC card is operable not only as a single body of a card but also in a form attachable to a terminal unit. For those purposes, an IC card contains a battery, an internal clock signal generating circuit for generating an internal clock signal, and a processing circuit. Further, in the form of the single body of the card, the processing circuit operates in response to the internal clock signal.

When such a card is attached to a terminal unit, an external power is supplied from the terminal unit to the IC card and an external clock signal is also supplied thereto. The processing circuit in the IC card operates in response to the external clock signal. Thus, switching between the clock signals is required to apply the internal clock signal when the IC card is to operate in the form of a single body and to apply the external clock signal when an IC card is attached to the terminal unit. For those purposes, it is necessary to determine whether the IC card is operating as a single body or it is connected to a terminal unit. Methods for such determination include a method of detecting a mechanical contact of an external terminal provided in the IC card, and a method of detecting a difference between the voltage of the battery contained in the IC card and that of the internal power supplied when the card is attached to the terminal unit.

However, in view of the structure of an IC card in general, it is difficult to attach a detector to its external terminal for the purpose of detecting the above mentioned mechanical contact. The method of detecting the difference of the voltages cannot always be utilized. For example, in cases in which there is only a small difference between the voltage of the battery contained in the IC card and the voltage of the external power supply, and when a noise is mixed in the case of using the IC card as a single body, it is often erroneously determined that the card is attached to a terminal unit, thereby causing errors in operation.

If an IC card is forcibly ejected from the terminal unit during communication of data between the card and the terminal unit, switching from the external clock signal to the internal clock signal occurs abruptly. This can cause disorder in the program contained in the IC card.

SUMMARY OF THE INVENTION

Therefore, a principal object of the present invention is to provide a clock signal switching device of an IC card, which can be operated stably irrespective of whether the IC card is utilized as a single body or it is attached to a terminal unit.

Briefly stated, according to the present invention, in an IC card contains a battery and a clock signal generating circuit for generating an internal clock signal. It operates in response to the internal clock signal. Further, an electric power and an external clock signal are supplied from a terminal unit when the I.C. card is attached to the terminal unit. Pulses of the external clock signal supplied from the terminal unit are counted and in response to the count of a predetermined number of pulses of the external clock signal, the external clock signal is selected and outputted in place of the internal clock signal.

Therefore, according to the present invention, it can be correctly determined whether the IC card is operated as a single body or it is attached to a terminal unit.

In a preferred embodiment of the present invention, an internal clock signal is outputted in place of the external clock signal after a lapse of a predetermined period in response to detection of no input of the external clock signal and input of the internal clock signal.

Consequently, according to the preferred embodiment of the invention, the internal clock signal is selected after the lapse of the predetermined period after the external clock signal is not inputted. Accordingly, an abrupt change from the external clock signal to the internal clock signal does not occur. Further, there is no fear of disorder in the program contained within the IC card.

The foregoing and other objects, features, aspects and advantages of the present invention will become more readily apparent from the following detailed description of the present invention when taken in conjunction with the accompanying drawings.

BRIEF DESCRIPTION OF THE DRAWINGS

FIGS. 3(a)–3(k), 4(a)–4(i h), and 5(a)–5(f) are timing charts for explaining operation of the embodiment of the present invention.

DESCRIPTION OF THE PREFERRED EMBODIMENTS

Figure 1A:
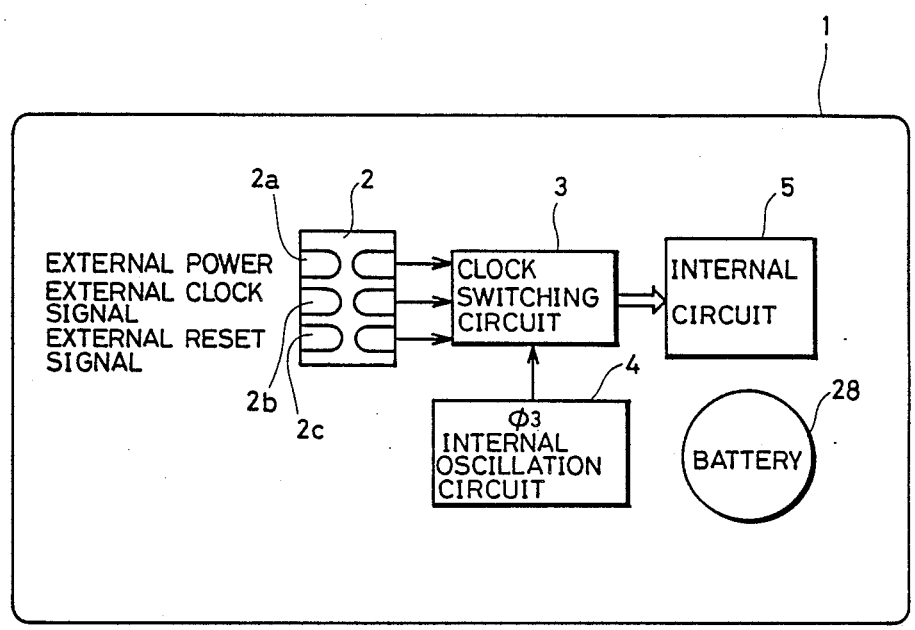
FIGS. 1A and 1B are block diagrams showing an entire construction of an embodiment of the present invention.
Figure 1B:
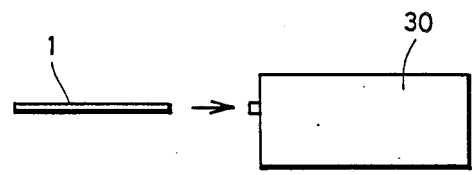

FIGS. 1A and 1B are block diagrams showing an entire construction of an embodiment of the present invention.

Referring first to FIGS. 1A and 1B, the construction of the embodiment of the invention will be described. An IC card 1 has an external terminal set 2. This external terminal set is used to electrically connect the IC card 1 to a terminal unit 30 when the card 1 is attached thereto. An external power, an external clock signal and an external reset signal are applied from the terminal unit 30 through respective terminals 2a, 2b and 2c of the external terminal set 2. Those external power, the external clock signal and external reset signal are applied to a clock switching circuit 3. An internal oscillation circuit 4 is provided to generate an internal clock signal. The clock switching circuit 3 switches between an internal clock signal generated from the internal oscillation circuit 4 and the external clock signal inputted through the external terminal set 2 and applies the signal selected by the switching to an internal circuit 5. When the IC card 1 is not attached to the terminal unit 30, electric power is supplied from a battery 28 to the clock switching circuit 3, the internal oscillation circuit 4 and the internal circuit 5.

Figure 2A:
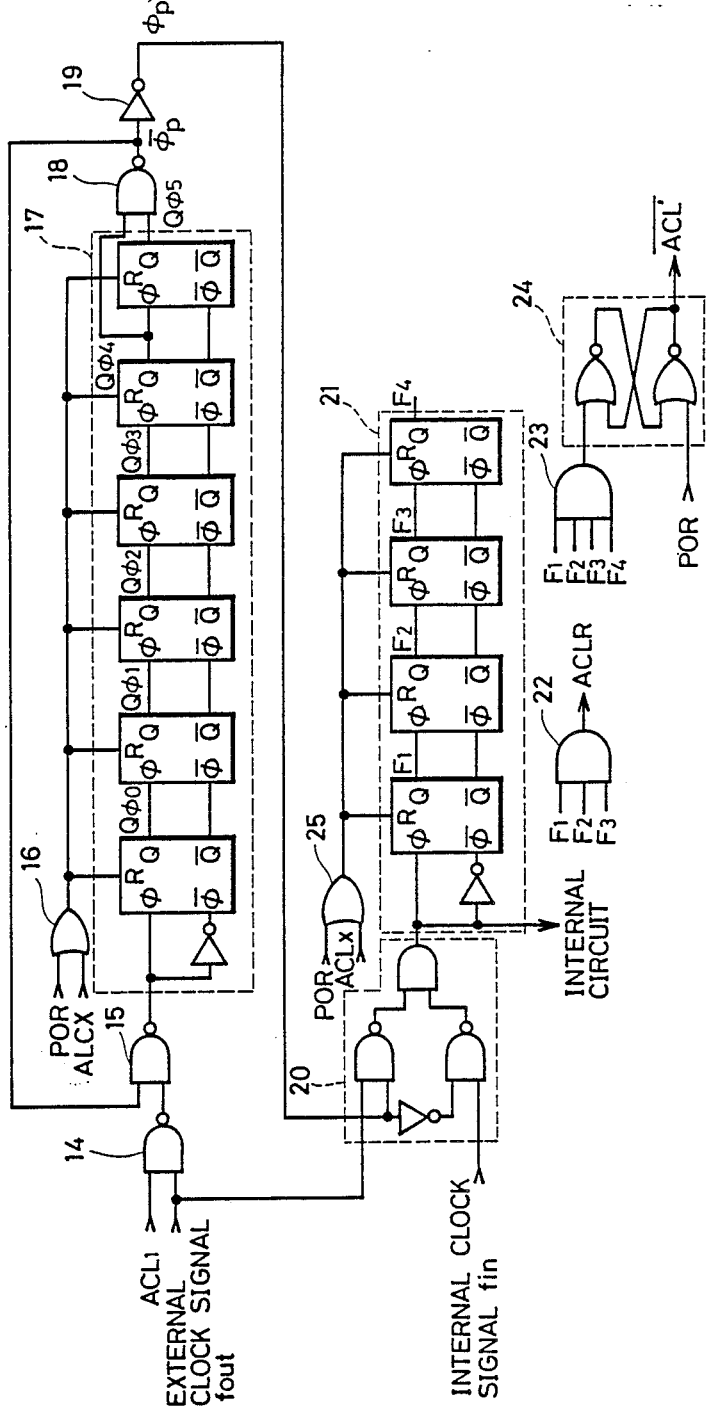
FIGS. 2A and 2B are specific electric diagrams of the embodiment of the present invention.
Figure 2B:
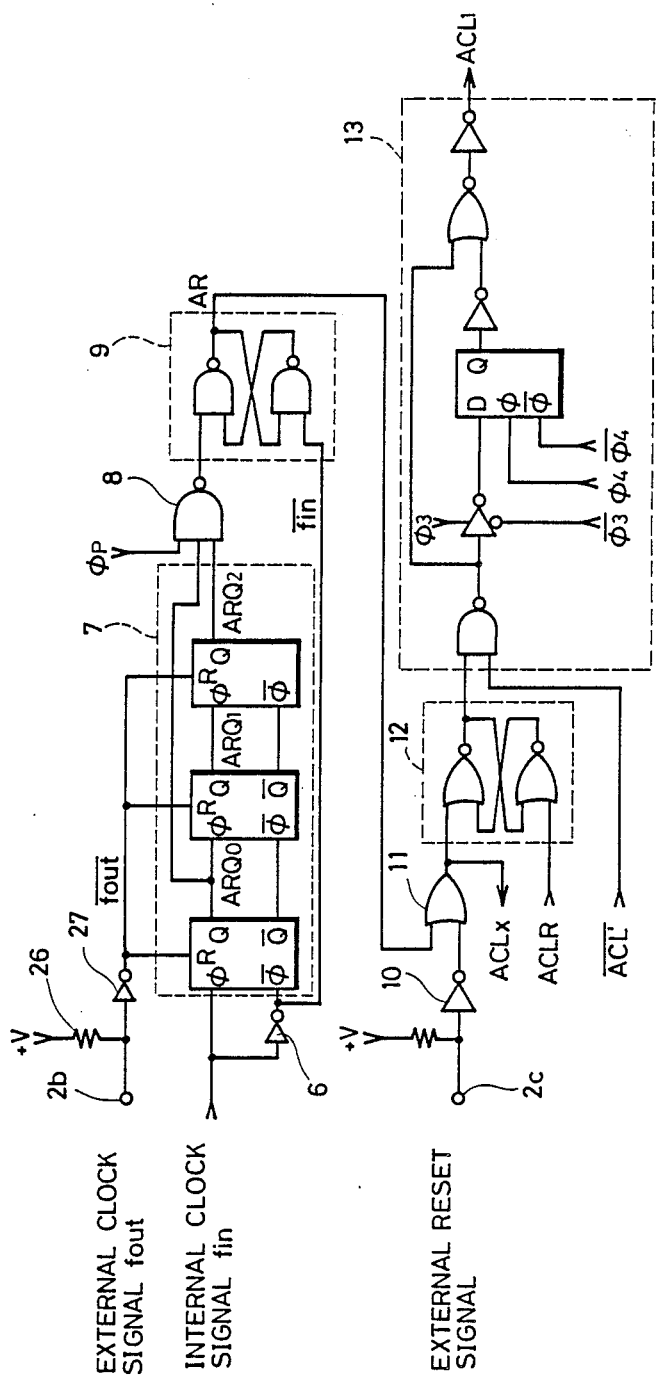

FIGS. 2A and 2B are specific definite electric circuit diagrams of the embodiment of the invention.

Referring first to FIG. 2A, a counter 17 is provided to output signals $Q\phi4$ and $Q\phi5$ for outputting a signal $\overline{\phi p}$ of a low (L) level from a NAND gate 18 and a signal $\phi p$ of a high (H) level from an inverter 19 in response to the count of a predetermined number of pulses of an external clock signal $f_{out}$. A switching circuit 20 is used to switch between an internal clock signal $f_{in}$ and the external clock signal $f_{out}$ in response to the signal $\phi p$, so that either clock signal is outputted as a system clock $\phi$ to the internal circuit 5 shown in FIG. 1 and to a counter 21. The counter 21 is provided to output signals F1 to F4 for forming timing signals ACLR and $\overline{ACL'}$ by means of gates 22 and 23 and a latch circuit 24.

Referring to FIG. 2B, a counter circuit 7 is reset by an external clock signal $\overline{f_{out}}$, counts pulses of the internal clock signal $f_{in}$ and generates timing signals ARQ0 to ARQ2 for forming a signal AR. A latch circuit 12 is latched by an external reset signal and it is reset by a signal ACLR which attains H level after several cycles from the switching from the internal clock signal $f_{in}$ to the external clock signal $f_{out}$. A synchronizing circuit 13 is provided to generate a signal ACL1 which synchronizes the output of the latch circuit 12 with clock signals $\phi3$ and $\phi4$ generated from the system clock $\phi$.

FIGS. 3, 4 and 5 are timing charts for explaining a definite operation of this embodiment.

Referring to FIGS. 2A to 5, the definite operation of the embodiment will be described. First, in the case of operating the IC card 1 singly without being attached to the terminal unit 30, a power supply switch (not shown), provided in the IC card 1, is operated and then a power-on reset signal POR is applied to a reset input terminal of the counter 17 through an OR gate 16 shown in FIG. 2A. Thus, the counter 17 is reset. The power-on reset signal POR is also applied to the counter 21 through an OR gate 25, whereby the counter 21 is reset. In consequence, the outputs $Q\phi4$ and $Q\phi5$ of the counter 17 are lowered to L level and the respective outputs are supplied to the NAND gate 18. The signal $\overline{\phi p}$ outputted from the NAND gate 18 rises to H level and it is applied to one input terminal of the NAND gate 15. In consequence, this NAND gate 15 is opened. Further, the signal $\overline{\phi p}$ is inverted by the inverter 19 to the signal $\phi p$ of L level, which is applied to the switching circuit 20. In response to this signal $\phi p$, the switching circuit 20 selects the internal clock signal $f_{in}$ and outputs this signal as the system clock pulse $\phi$ to the internal circuit 5 shown in FIG. 1. Then, in response to the system clock pulse $\phi$, the internal circuit 5 carries out predetermined operation.

Next, operation in the case of attaching the IC card 1 to the terminal unit 30 will be described. When the IC card 1 is attached to the terminal unit 30, the external power, the external clock signal $f_{out}$ and the external reset signal are applied from the terminal unit 30 to the external terminal set 2 of the card 1. The external reset signal of L level is inverted by the inverter 10 as shown in FIG. 2B and it is supplied as the signal ACL of H level to the OR circuit 11 as shown in FIG. 3(c). The OR circuit 11 outputs a signal ACLx of H level and in response to this signal, the latch circuit 12 is latched. The output of the latch circuit 12 is supplied to the synchronizing circuit 13 and the synchronizing circuit 13 synchronizes the clock pulses $\phi3$ and $\phi4$ with the output of the latch circuit 12. It then outputs the signal ACL1 as shown in (j) of FIG. 3(j). This signal ACL1 is applied to one input terminal of the NAND gate 14. As a result, the NAND gate 14 is opened. The external clock signal $f_{out}$ as shown in FIG. 3 (b) is applied to the other input terminal of the NAND gate 14. The external clock signal $f_{out}$ is applied to the NAND gate 15 through the NAND gate 14.

At this time, the counter 17 is reset by the application of the signal ACLx outputted from the OR circuit 11 shown in FIG. 2B through the OR circuit 16 and, as shown in FIG. 3(f) and FIG. 3(g), the outputs $Q\phi4$ and $Q\phi5$ are respectively at L level. In consequence, the signal $\overline{\phi p}$ outputted from the NAND gate 18 rises to H level as shown in FIG. 3(b), so that the NAND gate 15 is opened. As a result, the external clock signal $f_{out}$ is applied to the counter 17 through the NAND gate 15. The counter 17 starts counting pulses of the external clock signal $f_{out}$. When a predetermined number of pulses of the external clock signal $f_{out}$ are counted, that is, when the outputs $Q\phi4$ and $Q\phi5$ of the counter 17 rise to H level, the signal $\overline{\phi p}$ outputted from the NAND gate 18 falls to L level. Thus, the NAND gate 15 is closed. As a result, the external clock signal $f_{out}$ is not applied to the counter 17. Thus, the counter 17 stops counting pulses of the external clock signal $f_{out}$.

On the other hand, the signal $\overline{\phi p}$ of L level is inverted by the inverter 19 to H level and the signal of H level is applied to the switching circuit 20. In response to the signal $\overline{\phi p}$, the switching circuit 20 outputs the external clock signal $f_{out}$ as the system clock $\phi$ to the internal circuit 5. At the same time, the system clock $\phi$ is applied to the counter 21, so that the counter 21 outputs the timing signals F1 to F3 as shown in FIG. 5(c), FIG. 5(d) and FIG. 5(e). When all of the timing signals F1 to F3 attain H level, the AND gate 22 outputs the signal ACLR of H level as shown in FIG. 3(k) FIG. 5(f) and the latch circuit 12 shown in FIG. 2B is reset by the signal ACLR. When the latch circuit 12 is reset, the synchronizing circuit 13 outputs the signal ACL1 falling to L level as shown in FIG. 3(j). The NAND gate 14 is closed by the signal ACL1 and the external clock signal $f_{out}$ is not applied to the NAND 15.

The signal ACL1 is used to enable the internal circuit 5. More specifically, the internal circuit 5 is initialized in a period of H level of the signal ACL1 and after the signal ACL1 falls to L level, the internal circuit 5 operates. Thus, as shown in FIG. 3(j), since the signal ACL1 falls to L level after several cycles from the switching from the internal clock signal $f_{in}$ to the external clock signal $f_{out}$, the internal circuit 5 operates stably and erroneous operation can be prevented.

Referring now to the timing chart of FIG. 4, description will be made of the case in which the IC card 1 is forcibly removed from the terminal unit 30. When the IC card 1 is removed from the terminal unit 30, the external clock signal $f_{out}$ is no longer applied. On this occasion, the input terminal for the external clock signal $f_{out}$ is pulled up by a resistor 26 as shown in FIG. 2B and accordingly it is raised to H level. The signal of H level at this terminal is inverted by the inverter 27 and it is applied to the reset input terminal of the counter 7. Thus, the counter starts counting pulses of the internal clock signal $f_{in}$ shown in FIG. 4(a). When the signals ARQ0 and ARQ2 of the counter 7 both rise to H level and the signal $\phi p$ rises to H level as shown in FIG. 4(b) and FIG. 4(d), the latch circuit 9 is latched and the signal AR outputted from the latch circuit 9 rises to H level as shown in FIG. 4(e). This signal AR is inputted to the OR circuit 11 and the signal ACLx outputted from the OR circuit 11 rises to H level as shown in FIG. 4(g). Thus, the latch circuit 12 is latched.

When the signal ACLx rises to H level, the counters 7 and 21 shown in FIG. 2A are reset and the NAND gate 18 outputs the signal $\phi p$ of H level, while the inverter 19 outputs the signal $\overline{\phi p}$ of L level as shown in FIG. 4(h). In consequence, the switching circuit 20 selects the internal clock signal $f_{in}$ and outputs it to the internal circuit 5. Thus, when the IC card 1 is forcibly ejected from the terminal unit 30, switching occurs from the external clock signal $f_{out}$ to the internal clock signal $f_{in}$. Thereafter, the signal ACL1 falls to L level, whereby the internal circuit 5 starts operation.

As described in the foregoing, according to the embodiment of the present invention, when the IC card is attached to a terminal unit, pulses of the external clock signal supplied from the terminal unit are counted. Further, in response to counting of a predetermined number of pulses of the external clock signal, the external clock signal is selected and outputted in place of the internal clock signal. Accordingly, it can be correctly determined whether the IC card is operated in the form of a single body or in the form attached to any terminal unit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In an IC card which includes a battery and clock signal generating device for generating an internal clock signal and operates in response to the internal clock signal, and to which electric power and an external clock signal are applied from a terminal unit when the IC card is attached to the terminal unit, a clock signal switching device of the IC card, for switching from the internal clock signal to the external clock signal, comprising:

clock signal counting means for counting pulses of said external clock signal supplied when said IC card is attached to said terminal unit; and clock signal switching means for selecting and outputting said external clock signal in place of said internal clock signal when said clock signal counting means counts a predetermined number of pulses of said external clock signal.

2. The clock signal switching device of claim 1, further comprising;

input clock signal detecting means for detecting no input of said external clock signal and input of said internal clock signal;

said clock signal switching means including means for outputting said internal clock signal in place of said external clock signal after a lapse of a predetermined time in response to the detection of no input of said external clock signal and input of said internal clock signal by said input clock signal detecting means.

3. The clock signal switching device of claim 1, wherein said IC card includes a processing circuit, and
said clock signal switching means includes,
 determining means for determining that said clock signal counting means counts the predetermined number of pulses of the clock signal, and
 enable signal generating means for outputting an enable signal for enabling and processing circuit after a lapse of a predetermined time in response to the determination of said predetermined number of pulses of the clock signal by said determining means.

4. The signal switching device of claim 3, wherein
said IC card includes a terminal for receiving an external reset signal for resetting said processing circuit, and
said enable signal generating means includes means for outputting said external reset signal as said enable signal in synchronization with said internal clock signal in response to application of said external reset signal.

* * * * *